(12) United States Patent
Jones

(10) Patent No.: US 8,489,784 B2
(45) Date of Patent: Jul. 16, 2013

(54) ADAPTIVE INTERCONNECTION SCHEME FOR MULTIMEDIA DEVICES

(75) Inventor: Graeme Peter Jones, Tampa, FL (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 12/983,233

(22) Filed: Dec. 31, 2010

(65) Prior Publication Data

US 2012/0173776 A1    Jul. 5, 2012

(51) Int. Cl.
| | |
|---|---|
| G06F 3/00 | (2006.01) |
| G06F 5/00 | (2006.01) |
| G06F 13/12 | (2006.01) |
| G06F 13/38 | (2006.01) |
| G06F 13/00 | (2006.01) |

(52) U.S. Cl.
USPC ............... 710/65; 710/58; 710/69; 710/70; 710/72; 710/100

(58) Field of Classification Search
USPC ............................. 710/65, 58, 69, 70, 72, 100
See application file for complete search history.

(56) References Cited

U.S. PATENT DOCUMENTS

| | | | | |
|---|---|---|---|---|
| 4,686,506 | A | | 8/1987 | Farago |
| 7,684,502 | B2 | * | 3/2010 | Kurobe et al. ............... 375/260 |
| 7,716,400 | B2 | | 5/2010 | Raines |
| 7,824,206 | B1 | * | 11/2010 | Wilson et al. ............... 439/350 |
| 7,965,628 | B2 | * | 6/2011 | Tien et al. .................... 370/229 |
| 8,176,214 | B2 | | 5/2012 | Jones |
| 2003/0157944 | A1 | * | 8/2003 | Nakao et al. ................. 455/456 |
| 2003/0221061 | A1 | * | 11/2003 | El-Batal et al. ............... 711/114 |
| 2006/0190549 | A1 | * | 8/2006 | Teramae et al. ............... 709/208 |
| 2007/0286246 | A1 | | 12/2007 | Kobayashi |
| 2008/0045049 | A1 | | 2/2008 | Collantes et al. |
| 2008/0091832 | A1 | | 4/2008 | Przybylski et al. |
| 2009/0061678 | A1 | * | 3/2009 | Minoo et al. ................. 439/502 |
| 2009/0108848 | A1 | | 4/2009 | Lundquist et al. |
| 2009/0128189 | A1 | | 5/2009 | Madurawe et al. |

(Continued)

FOREIGN PATENT DOCUMENTS

WO    WO-2009118582    10/2009

OTHER PUBLICATIONS

Hitachi Ltd. et al., "High-Definition Multimedia Interface: Specification Version 1.3," HDMI Licensing, LLC, Jun. 22, 2006, pp. 1-237.
International Search Report and Written Opinion mailed Jul. 31, 2012, in International Patent Application No. PCT/US2011/063901, 10 pages.

(Continued)

Primary Examiner — Idriss N Alrobaye
Assistant Examiner — Getente A Yimer
(74) Attorney, Agent, or Firm — Blakely Sokoloff Taylor Zafman LLP

(57) ABSTRACT

Embodiments of the invention are generally directed to adaptive interconnection for multimedia devices. An embodiment of an apparatus includes an apparatus that includes one or more ports, the one or more ports including one or more adaptable ports, where each adaptable port includes a receptacle to accept a plug of a connector element, the receptacle including multiple electrical contacts. The apparatus further includes an adaptable port device to process data including multimedia data received at the one or more adaptable ports, where the adaptable port device is to detect a multimedia signal format for multimedia data received at each of the adaptable ports, and adapt each of the adaptable ports to be compatible with the detected multimedia signal format for the adaptable port.

18 Claims, 13 Drawing Sheets

U.S. PATENT DOCUMENTS

| | | | |
|---|---|---|---|
| 2009/0157826 A1* | 6/2009 | Stettner | 709/206 |
| 2009/0157917 A1* | 6/2009 | Noh et al. | 710/38 |
| 2009/0177818 A1 | 7/2009 | Shim et al. | |
| 2009/0177820 A1 | 7/2009 | Ranade et al. | |
| 2009/0239559 A1 | 9/2009 | Hollis | |
| 2010/0312933 A1 | 12/2010 | Chou et al. | |
| 2010/0332569 A1 | 12/2010 | Bryant-Rich et al. | |

OTHER PUBLICATIONS

International Search Report and Written Opinion of the International Searching Authority in International Patent Application No. PCT/US2009/062232, mailed May 12, 2010, 15 pages.

Silicon Image VastLane Mobile HD Link Transmitter, Sil9224 Product Brief, Silicon Image, Inc., Sunnyvale, CA, May 2008, 2 pages.

* cited by examiner

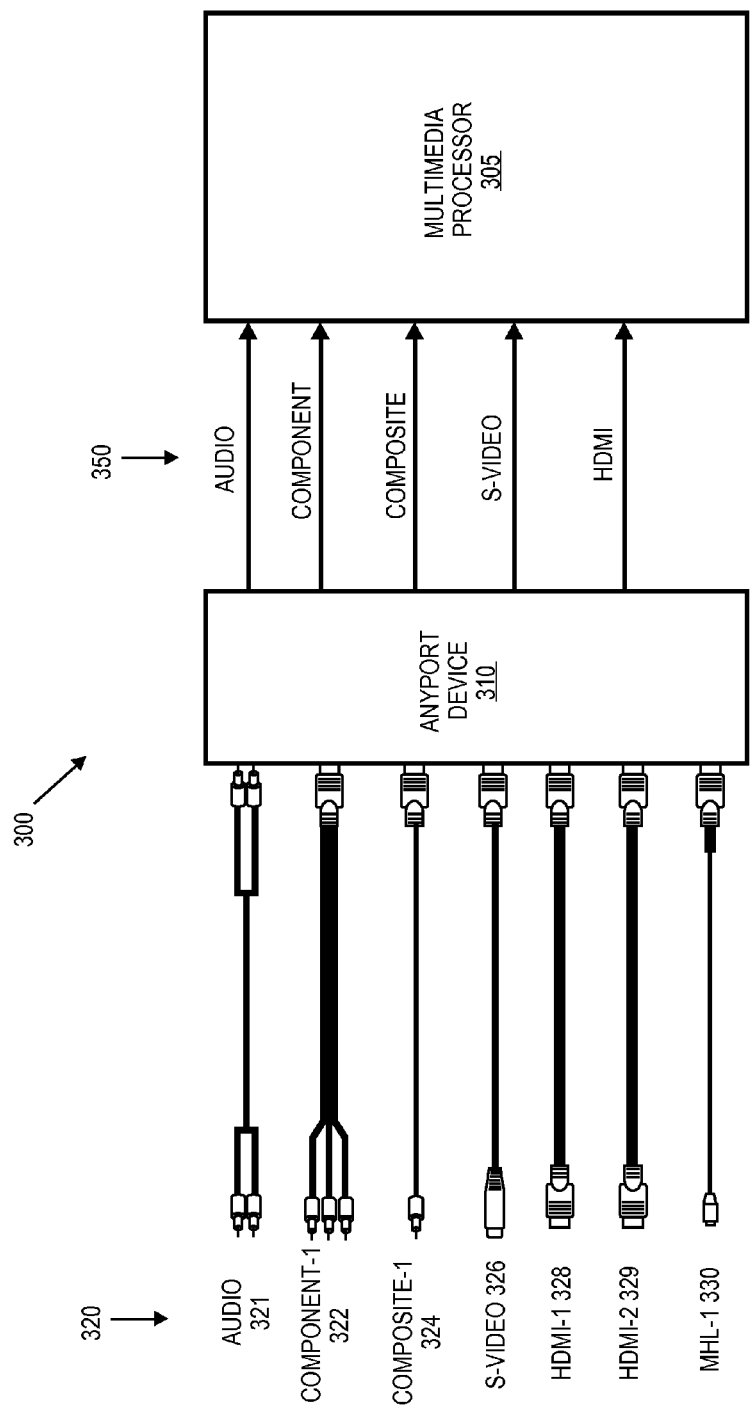

ADAPTIVE INTERCONNECTION SCHEME FOR MULTIMEDIA DEVICES

TECHNICAL FIELD

Embodiments of the invention generally relate to the field of electronic devices and, more particularly, to adaptive interconnection of multimedia devices.

BACKGROUND

Electronic devices, particularly entertainment devices, may interconnect with many other devices. For example, a receiving system or device (which may use, store, or retransmit received data) may interconnect with various multimedia data Sources, with the data Sources varying greatly in type and capability.

The various data Sources may provide data in various formats. In an example, a device may provide multimedia data including audio and video data, and in particular high-definition video data, in various formats, including composite video data, component video data, HDMI™ (High Definition Multimedia Interface 1.4 Specification, issued May 28, 2009), MHL™ (Mobile High-Definition Link) data formats.

However, devices utilizing different multimedia signal formats generally utilize multiple different types of connectors in order to support each multimedia signal format. The attempt to support such multimedia signal formats has resulted in an increasing number of possible connector types to include in each device, while each device may have only a limited amount of physical space for the wide variety of ports.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is an illustration of connections for an embodiment of a multimedia device or system providing for adaptive port interconnections;

SUMMARY

Figure 1:
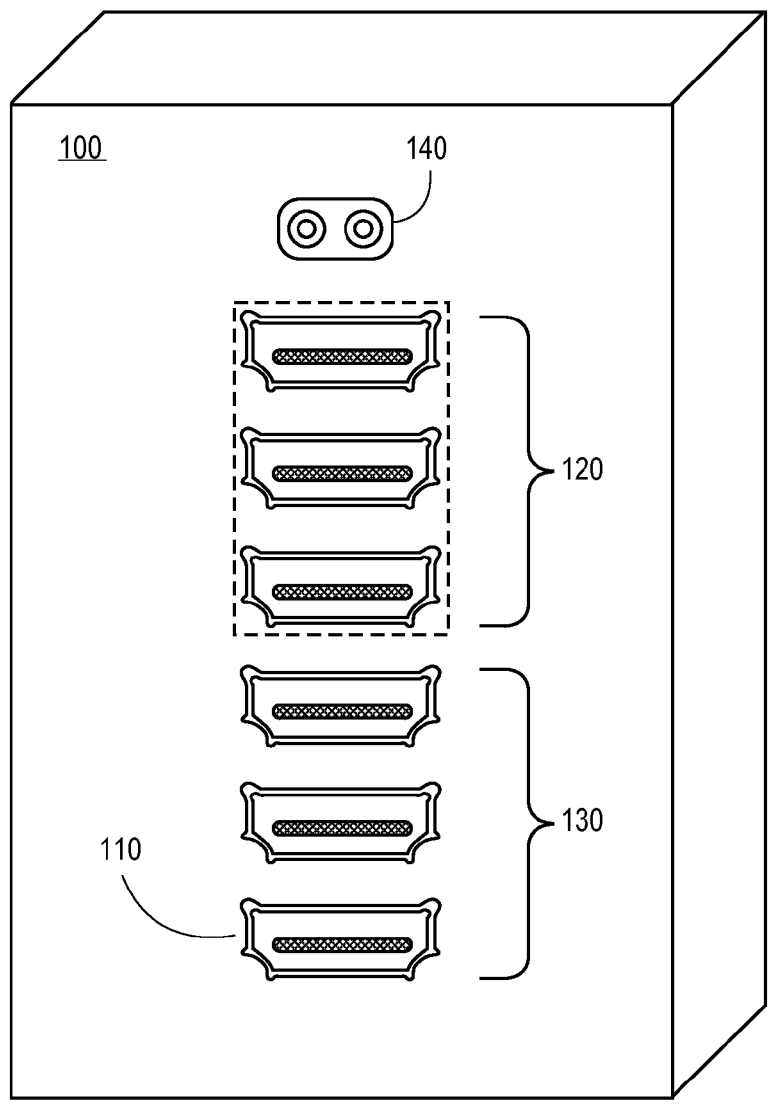
FIG. 1 illustrates a back panel of an embodiment of a device providing for adaptive port interconnection.

Embodiments of the invention are generally directed to adaptive device interconnection for multimedia devices.

In a first aspect of the invention, an apparatus includes one or more ports, the one or more ports including one or more adaptable ports, where each adaptable port includes a receptacle to accept a plug of a connector element, the receptacle including multiple electrical contacts. The apparatus further includes an adaptable port device to process data including multimedia data received at the one or more adaptable ports, where the adaptable port device is able to detect the multimedia signal format of multimedia data received at each of the adaptable ports, and adapt each of the adaptable ports to be compatible with the detected multimedia signal format for the adaptable port.

In a second aspect of the invention, an embodiment of a method includes receiving a connector element in a receptacle for an adaptable port of a device, the device having one or more ports including one or more adaptable ports, and receiving data including multimedia data at the adaptable port via the connector element. The method further includes detecting a multimedia signal format of the multimedia data received at the adaptable port, and adapting the adaptable port in accordance with the detected multimedia signal format.

DETAILED DESCRIPTION

Embodiments of the invention are generally directed to adaptive interconnection for multimedia devices In some embodiments, an apparatus, system, or method provides for adaptive device interconnection for multimedia Sources. In some embodiments, an apparatus or system that may receive multimedia data including video data from multiple cable connections provides multiple adaptive interconnections, wherein each of the plurality of adaptive interconnections includes the same port receptacle. In some embodiments, multimedia data may further include audio data, where audio data may be single channel or multichannel (such as right and left channels) audio. In some embodiments, any of a plurality of multimedia data devices may be connected to such port receptacle in a device or system, wherein the device or system adapts in response to the connection of the device or system.

In recent years, the digital HDMI connector has become the single most common single type of cable connector to be used on entertainment devices worldwide. As the form-factor of televisions has progressed from an approximate cube to a thin-flat panel design, the available space for the connector area has grown progressively smaller.

In addition, modern entertainment device designs may attempt to simplify the cable connection procedure required by the user so that their "out of the box" experience is as trouble-free as possible.

However, conversely, entertainment device manufacturers are compelled to support several "legacy" analog input signal formats for the immediate future in order to support interfaces to older video, audio, and data Sources.

In some embodiments, a device utilizing a single type of connector provides for adaptive device interconnection with other devices. For example, an entertainment device may provide cable connections that include only HDMI connectors. In some embodiments, the signal function of connectors may be repurposed by means of various adaptor cables that all have an HDMI connector at the entertainment device end.

However, the use of a plurality of a single connector generally requires some adaption of the connection in order to provide proper connection. In some embodiments, a device utilizes one or more processes to automatically adapt a connection to the appropriate signal format for a multimedia data Source. In some embodiments, a system or apparatus includes logic or circuitry to adapt the connection by automatically detecting the type of signal format presented to it by the multimedia data Source and reconfiguring the receivers of the Sink device or system to accept this single format without user intervention.

In some embodiments, logic or circuitry may be configured for a multimedia data Source using one or more of the following:

(1) Mechanical or other keying of the connectors. In some embodiments, a cable connector includes keying to provide identification of a multimedia data format, where the receiving device identifies the multimedia data format based at least in part on the keying.

(2) Indirect electrical indication of the multimedia signal formats. In some embodiments, a multimedia data Source may provide an electrical signal to allow for detection of a multimedia signal format, where a receiving device identifies the multimedia signal format at least in part based on the indirect electrical indication. In some embodiments, an apparatus or system may operate by, for example, detecting impedances or detecting voltages resulting from connections of pullup or pulldown resistors that pull connector pins up or down to pre-determined voltage potentials.

(3) Pre-engaged contacts of connectors. In some embodiments, a connection may include one or more pre-engaged contacts, where the pre-engaged contacts are physically structured, such as in multiple mating planes, in order that a pre-engaged contact will engage before other contacts are engaged. In one example, a connector may be structured such that a ground contact is engaged before other contacts in order to establish the ground connection before any electrically charged contacts are engaged. In a second example, a connection may include a switch that is engaged, such as by a keying of a connector, prior to engagement of electrical contacts, which may serve to, for example, inform a device regarding the connection that is being made prior to completing the electrical connection.

In an example, a connection may utilize a receptacle that is a certain depth (e.g., 10 mm) for a connector. In this example, the receptacle may engage one or more pre-engaged contacts at a lesser depth (e.g., 5 mm) within the receptacle prior to completing the insertion of the connector through the full depth of the receptacle.

In a connection at a port, power may be applied in certain states, such as, for example, a circumstance in which a mobile Source device (including a smart phone, mobile Internet device, or other mobile device) is attached to a Sink device (such as a Television, Monitor, AV Receiver or Projector) that provides a charging voltage to the mobile Source device. However, the incorrect application of power to a device can cause potential damage to it. In some embodiments, when a connection is made with a port the Sink device maintains the port in a state in which the Source device is protected (which may referred to as a safe mode or neutral state) until the Sink device has determined what is connected to the port, using one of the processes described above. In some embodiments, the port includes an interlock mechanism to assist in preventing incorrect application of power.

In some embodiments, detection of a multimedia signal format may utilize a combination of the detection processes. In some embodiments, a receiving device may be informed of the need to detect a signal format by a first process, and may identify the multimedia signal format using a second process. In an example, a particular keying of a cable connection may inform a receiving device or system that the multimedia signal format is to be detected, such as by direct detection or indirect electrical detection.

In some embodiments, an apparatus or system provides for "connector trading", whereby the apparatus or system may "trade off" modern connectors for legacy connectors. In an example, an apparatus or system modern digital HDMI or MHL connections for legacy analog ones without the requirement for additional physical connectors.

In some embodiments, a cable for a connection between a Source device and a Sink device includes one or more keys, the keys being coupled with or a part of a connector for the cable. In some embodiments, the one or more keys act to prevent mis-mating of cable connections, where certain connections with Sink devices may not be compatible with the Source device. In some embodiments, the one or more keys may engage one or more switches of Sink devices to indicate a certain type of Source device.

For the purpose of this description, "key" includes any physical extension of or from a connector, the key being arranged such that the key is inserted into a portion of a device as a plug of the connector is inserted into a port receptacle or socket.

In some embodiments, a Sink device includes a port receptacle unit (or socket) having one or more passages for acceptance of one or more keys of a connector to be plugged into the port receptacle unit. In some embodiments, the Sink device further includes one or more switches that are engaged by one or more keys of a connector that is plugged into the receptacle unit.

For the purpose of this description, a "passage" includes any hole, notch, indentation, or other shaping of a portion of a device, the passage being placed such that a key of connector passes into or through the passage.

For the purpose of this description, a "switch" is any type of element that is engaged by the insertion of an appropriate key of a connector into a corresponding passage. A switch may include a physical switch that is pushed on or off by a key. A switch may further include an optical switch, such as a switch that is engaged when a key blocks an optical signal in a Sink device.

FIG. 1 illustrates a back panel of an embodiment of a device providing for adaptive port interconnection. In some embodiments, a Sink or repeater device 100 that receives multimedia data in a plurality of formats may include a plurality of ports for receipt of video and other data, including, for example, a plurality of HDMI port receptacles 110. In some embodiments, the plurality of ports may include one or more adaptive ports 120 that may be utilized for a plurality of different multimedia signal formats, where the device 100 operates to adapt the adaptive ports 120 to conform to received multimedia signal formats. In some embodiments, the device 100 may also include one or more non-adaptive ports 130, where the non-adaptive ports operate as a standard port under the defined multimedia signal format of the port. In this illustration, the non-adaptive ports 130 operate as HDMI ports, while the adaptive ports 120 operate as a plurality of different types of ports including HDMI. In some embodiments, the device 100 may further include a separate audio input 140, such illustrated here as two input jacks for left and right audio inputs. In some embodiments, the adaptive ports 120 may receive a video-only input, such as in the receipt of a multimedia format that does not include audio, and audio data may be received at the separate audio input 140.

Figure 2:
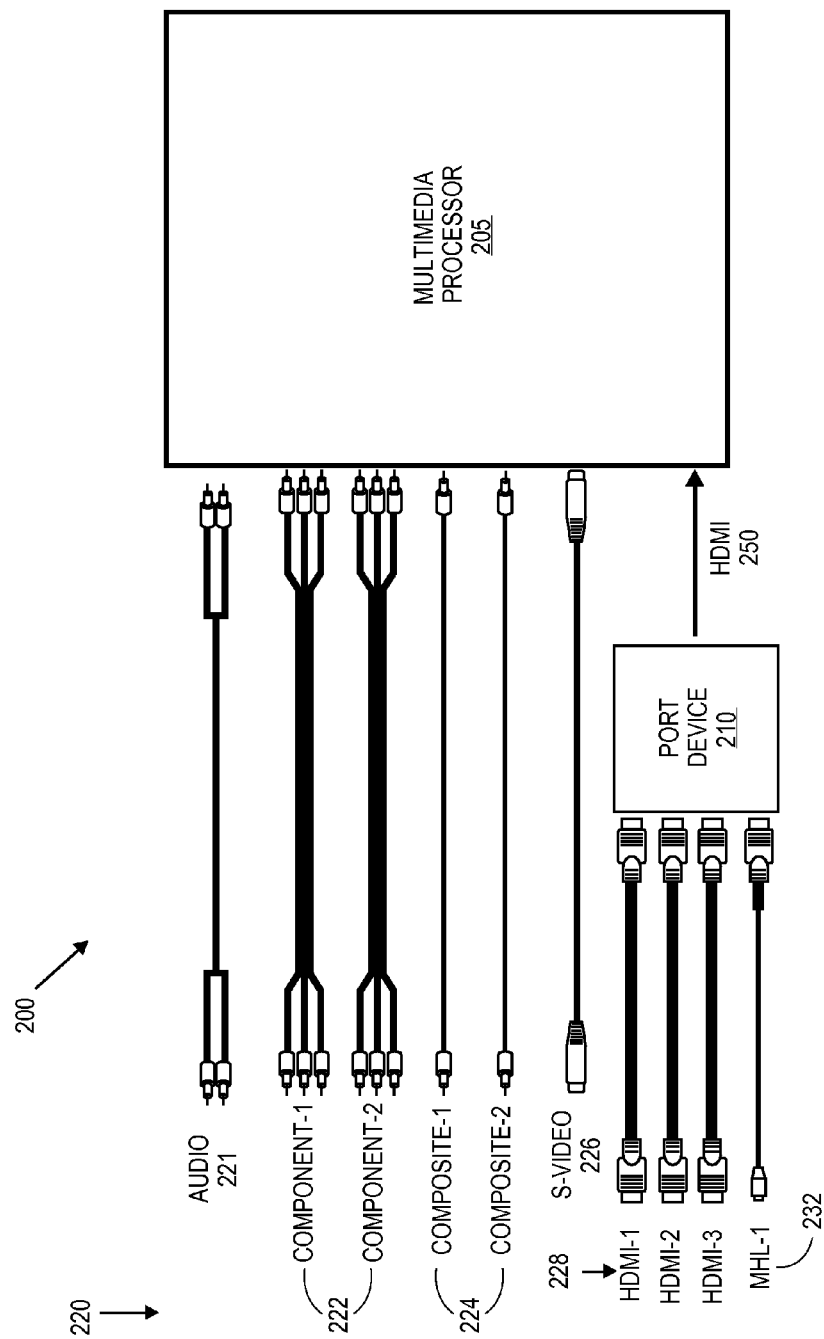
FIG. 2 is an illustration of connections for a multimedia device or system.

FIG. 2 is an illustration of connections for a multimedia device or system. In this illustration, a device 200 may include a plurality of connections for receipt of different multimedia formats 220. The device 200 may include a multimedia processor 205 for receipt and processing of multimedia data including, for example, audio data 221 (used for, as an example, multimedia standards that do not include delivery of audio data with video data), component video data 222 (shown as Component-1 and Component-2), composite video data 224 (Composite-1 and Composite-2), S-Video data 226, HDMI 228, and MHL 232. The HDMI may be received at a port device 210 and include multiple HDMI multimedia data Sources 228 (HDMI-1, HDMI-2, and HDMI-3) and MHL multimedia data Sources 232 (MHL-1) to provide HDMI data 250.

FIG. 3 is an illustration of connections for an embodiment of a multimedia device or system providing for adaptive port interconnections. In some embodiments, a device 300 may include a plurality of connections for receipt of different multimedia data formats 320 through use of adaptive port interconnections. In some embodiments, the device 300 may include a multimedia processor 305 for receipt and handling of multimedia signal formats 350 (audio, Component, Composite, S-Video, and HDMI in this illustration), and further includes an adaptive multimedia data port device (which may be referred to as an AnyPort Device) 310. In some embodiments, the adaptive port device 310 operates to adapt the ports of the device to multiple different multimedia signal formats such that each of the received data Sources may utilize the same type of port, while the multimedia processor 305 receives the appropriate data format from the adaptive port device 310 regardless of which port of the device a multimedia data Source uses. Thus, in some embodiments a user may take a cable from a multimedia data Source, such as the illustrated component video data 322, composite video data 324, S-Video data 326, HDMI multimedia data (HDMI-1 328 and HDMI-2 329), and MHL multimedia data 330, and plug the cable into any of the adaptive ports for the adaptive port device 310, with the adaptive port device adapting the ports as required for the multimedia signal format received. In some embodiments, the cable connection further includes a separate audio connection 321 for use in conjunction with multimedia data formats that do not provide for delivery of audio data together with video data.

Figure 4A:
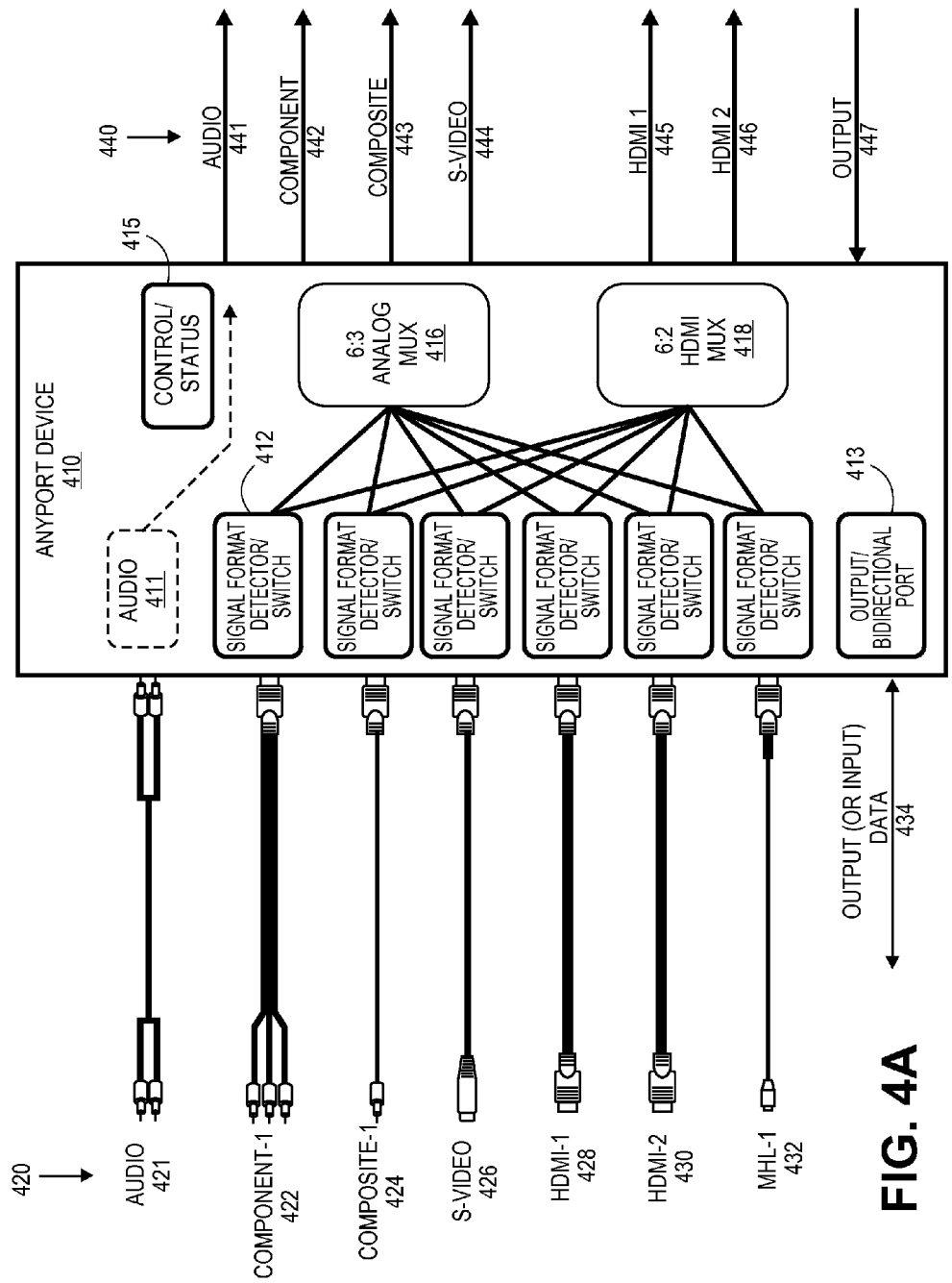
FIG. 4A is an illustration of an embodiment of a device to provide adaptive port interconnections.

FIG. 4A is an illustration of an embodiment of an adaptive port device to provide adaptive port interconnections. In this illustration, an adaptive port device 410 is operable to adapt multiple adaptive ports such that received multimedia signal formats 420, shown here as audio data 421, component video data 422, composite video data 424, S-Video data 426, HDMI multimedia data (HDMI-1 428 and HDMI-2 430), and MHL multimedia data 432, may be received at any of a plurality of adaptive ports. In some embodiments, each port includes a signal format detector and switch 412 that operates to detect a multimedia signal format of an attached multimedia data Source, and to adapt the port for receipt of the detected multimedia signal format. In this illustration, the adaptive port device 410 includes six ports, each including a signal format detector and switch 412. In some embodiments, the audio data may be received at an audio port 411, which may include audio data for a multimedia format that does not provide for the delivery of audio data with video data. In some embodiments, the adaptive port device 410 includes a control and status module 415 to control the operation of the operations of the elements of the adaptive port device 410 and to maintain status information regarding the multimedia data that is received at the device.

In some embodiments, the adaptation of each of a plurality of adaptive ports includes the direction of analog multimedia data to a multiplexer to handle a class of multimedia data, such as an analog multiplexer 416 for analog multimedia data or to a digital multiplexer 418 (shown here as HDMI) for digital multimedia data. In this illustration, the analog multiplexer 416 is shown as a 6:3 multiplexer to direct data for each of six ports to an output 440 for one of three analog multimedia data types, illustrated here as a first output for component video data 442, a second output for composite video data 443, and a third output for S-Video data 444. In some embodiments, the outputs 440 may further include a separate analog audio output 441. As further provided in this illustration, the HDMI multiplexer 418 is shown as a 6:2 multiplexer to direct multimedia data to one of two HDMI outputs, illustrated here is HDMI-1 445 and HDMI-2 446. However, embodiments are not limited to any particular number of multiplexers for classes of multimedia data, or to any particular number of outputs for multimedia data.

In some embodiments, the port device 410 may further include an output port or bidirectional port 413 to allow the output of data, such as HDMI data, to other devices as well as the input of such data. For example, the port device 410 may receive output data 447, such as a data stream intended for another device, and utilize the output/bidirectional port 413 for the output of such data 434.

Figure 4B:
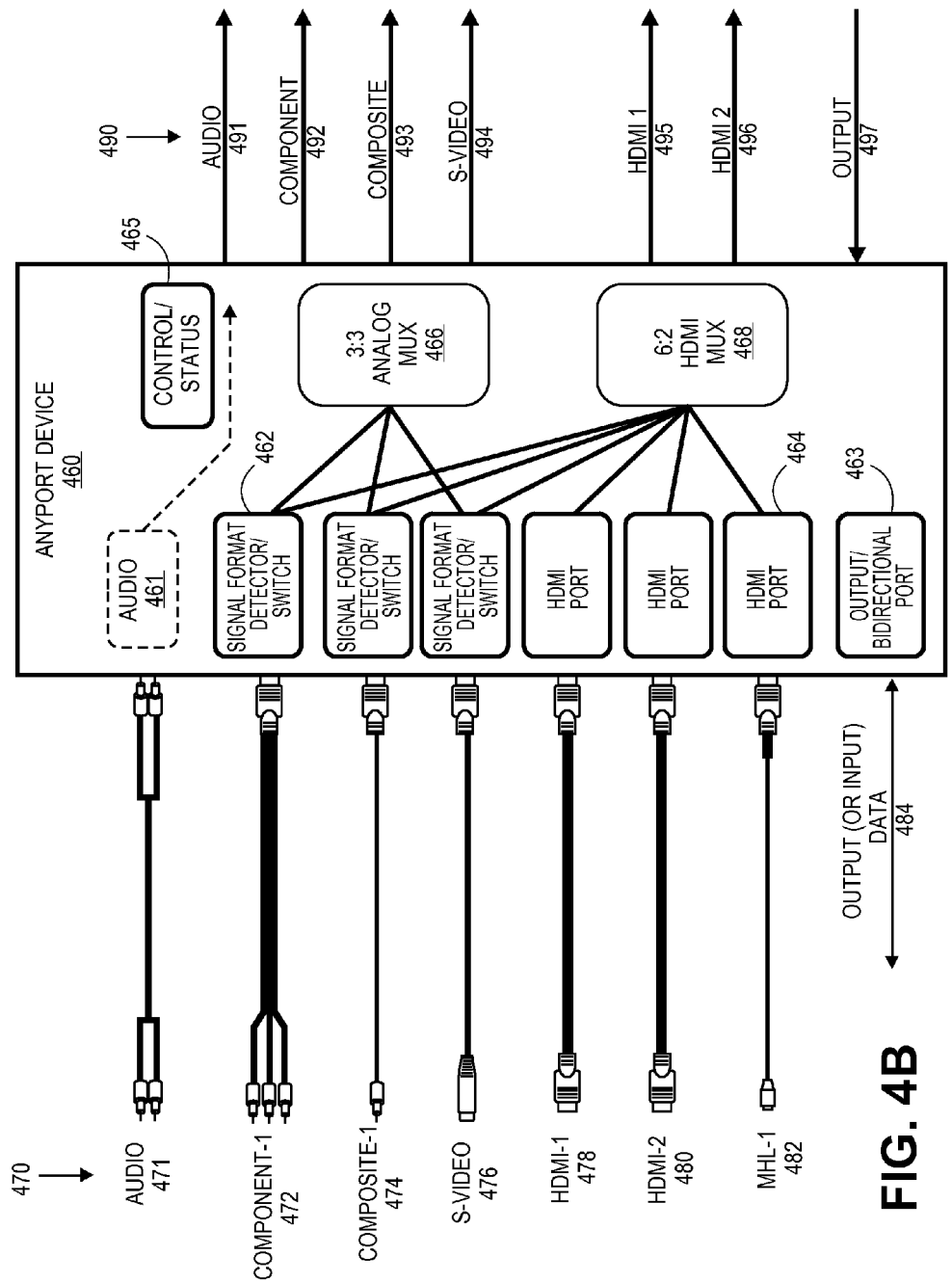
FIG. 4B is an illustration of an embodiment of a device to provide adaptive port and non-adaptive interconnections.

In some embodiments, a port device may include one or more non-adaptable ports as well as adaptable ports to allow for a simpler device. FIG. 4B is an illustration of an embodiment of a simplified adaptive port device to provide adaptive and non-adaptive port interconnections.

In this illustration, an adaptive port device 460 is operable to adapt multiple adaptive ports such that received multimedia signal formats 470, component video data 472, composite video data 474, S-Video data 476, and HDMI or MHL (not shown) may be coupled with one or more adaptive ports, while the device further includes one or more non-adaptive ports, such as HDMI ports, that may be used only of HDMI data. In this illustration, HDMI multimedia data (HDMI-1 478 and HDMI-2 480), and MHL multimedia data 432, may be received at the non-adaptive ports. In some embodiments, each adaptive port includes a signal format detector and switch 462 that operates to detect a multimedia signal format of an attached multimedia data Source, and to adapt the port for receipt of the detected multimedia signal format. In this illustration, the adaptive port device 460 includes three adaptive ports, each including a signal format detector and switch 462. In this illustration, the device 460 further includes three non-adaptive ports, each including an HDMI port 464. In some embodiments, audio data 471 may also be received at an audio port 461, which may include audio data for a multimedia format that does not provide for the delivery of audio data with video data. In some embodiments, the adaptive port device 460 includes a control and status module 465 to control the operation of the operations of the elements of the adaptive port device 460 and to maintain status information regarding the multimedia data that is received at the device.

In some embodiments, the adaptation of each of a plurality of adaptive ports includes the direction of analog multimedia data to a multiplexer to handle a class of multimedia data, such as an analog multiplexer 466 for analog multimedia data or to a digital multiplexer 468 (shown here as HDMI) for digital multimedia data. In this illustration, the analog multiplexer 466 is shown as a 3:3 multiplexer to direct data for each of the adaptive ports to an output 490 that may include one of three analog multimedia data types, illustrated here as a first output for component video data 492, a second output for composite video data 493, and a third output for S-Video data 494. In some embodiments, the outputs 490 may further include a separate analog audio output 491. As further provided in this illustration, the HDMI multiplexer 468 is shown as a 6:2 multiplexer to direct multimedia data from the adaptive or non-adaptive ports to one of two HDMI outputs, illustrated here is HDMI-1 495 and HDMI-2 496.

In some embodiments, the port device 460 may further include an output port or bidirectional port 463 to allow the output of data, such as HDMI data, to other devices as well as the input of such data. For example, the port device 460 may receive output data 497, such as a data stream intended for another device, and utilize the output/bidirectional port 463 for the output of such data 484.

Figure 5:
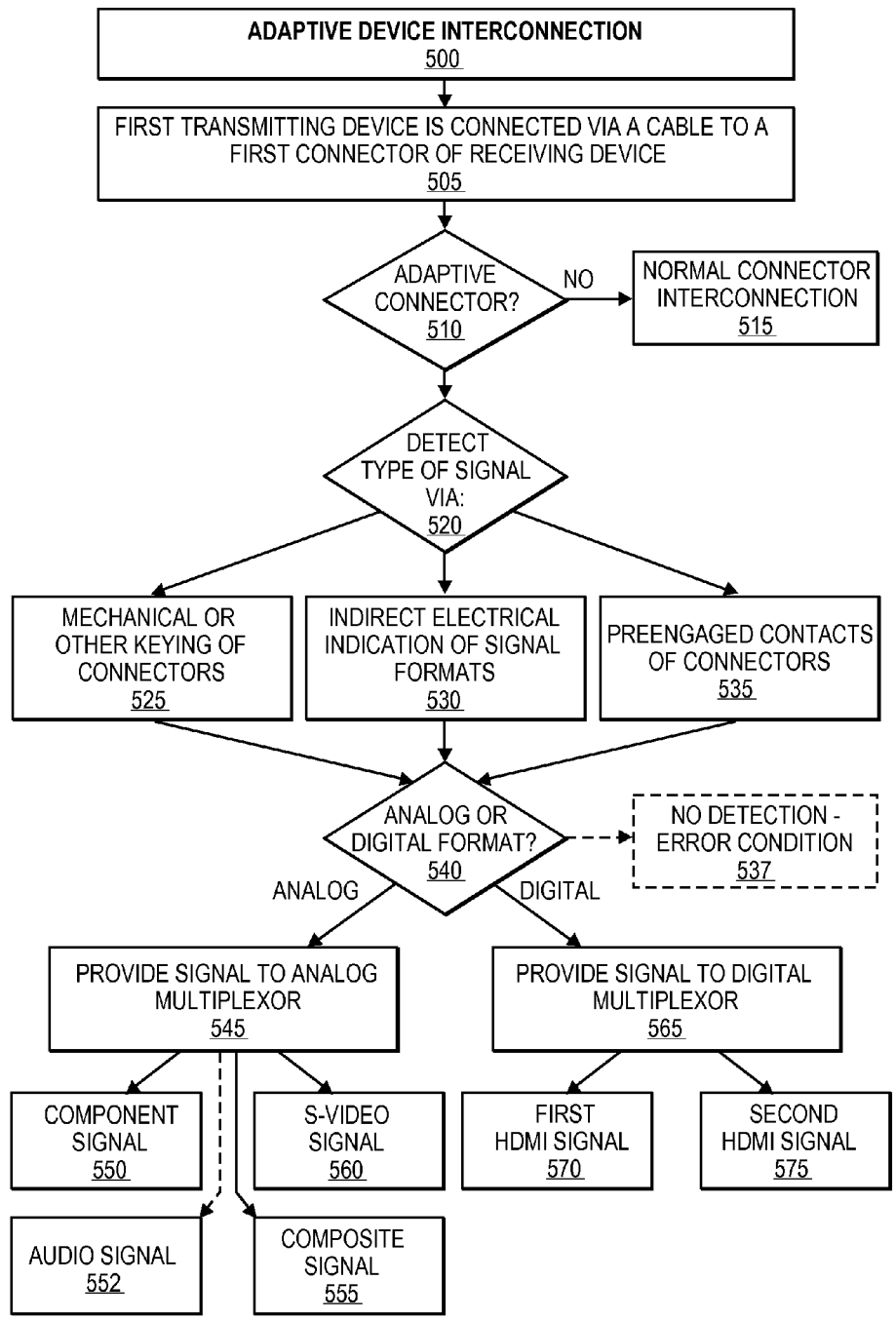
FIG. 5 illustrates an embodiment of a process for adaptive port interconnection.

FIG. 5 illustrates an embodiment of a process for adaptive port interconnection 500. In some embodiments, a first transmitting device is connected via a cable to a first port connector of a receiving device 505. In some embodiments, the receiving device may include one or more adaptive ports and one or more non-adaptive ports. If the first port connector is not an adaptive port connector 510, the resulting interconnection is a standard multimedia data interconnection 515, such as the receipt of HDMI data via a non-adaptive HDMI port.

If the first port connector is an adaptive port connector 510, then the type of multimedia data signal is detected 520, where the detection may include detection utilizing one or more of mechanical or other keying of connectors 525, indirect electrical detection of signal formats 530, such a detection of impedances or pullup or pulldown voltages, and preengagement of the contacts of connectors 535. In some embodiments, the detection of multimedia signal format may utilize a plurality of the detection processes 525-535. In some embodiment, if the process or processes do not result in detection of the multimedia signal format, the result may be an error condition 537.

In some embodiments, if the multimedia signal format is recognized there is a determination whether the multimedia data signal is of a particular class of multimedia data signal, such as analog multimedia data signal or a digital (such as HDMI) multimedia data signal 540. If the multimedia data signal is an analog multimedia data signal, the signal may be presented to an analog multiplexer 545 to direct the multimedia signal to an appropriate output, such as a component signal output 550, a composite signal output 555, or an S-Video signal output 560. In some embodiments, the output may further include an audio signal 552, which was embedded in the multimedia signal received by the receiving device. If the multimedia signal is a digital multimedia signal, the signal may be presented to a digital multiplexer 565 to direct the multimedia signal to an appropriate output, such a first HDMI signal output 570 or a second HDMI signal output 575.

Figure 6:
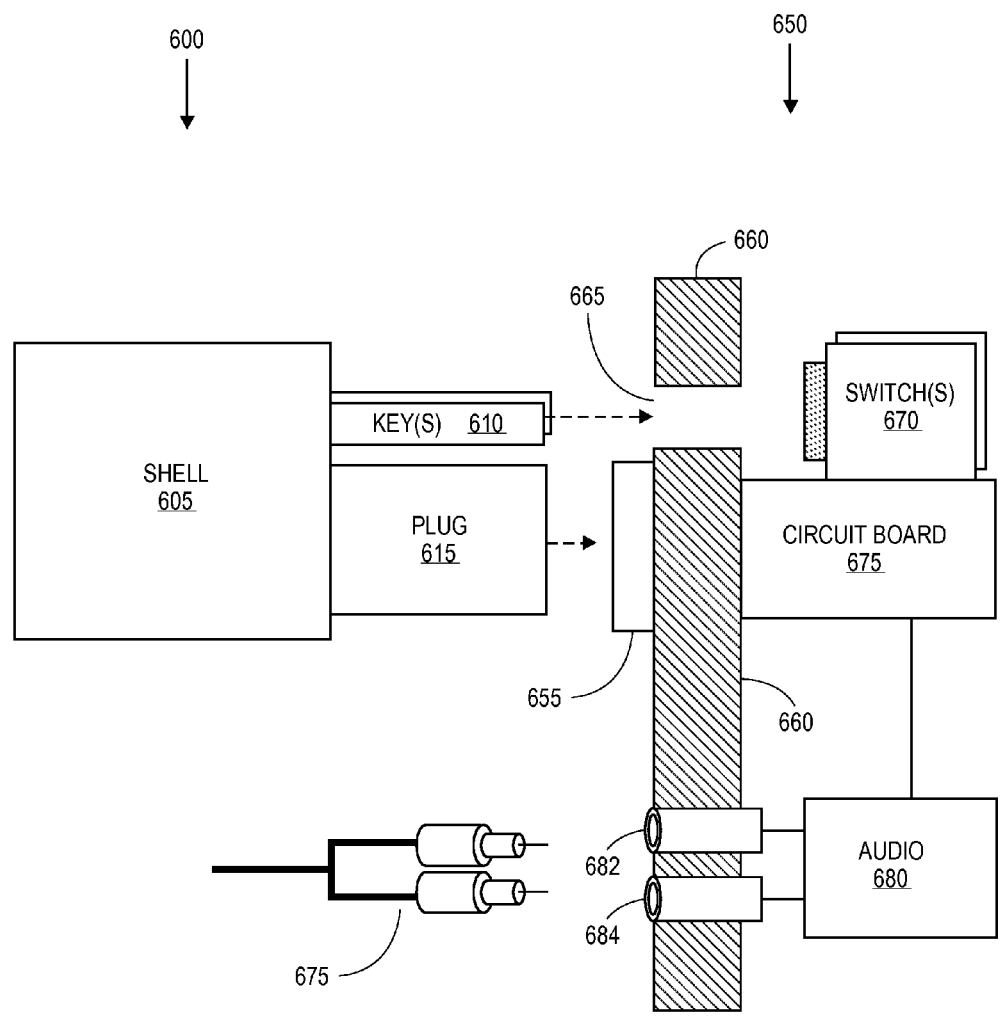
FIG. 6 is an illustration of an embodiment of the connection of a connector with one or more keys with a receptacle for an adaptable port.

FIG. 6 is an illustration of an embodiment of the connection of a connector with one or more keys with a receptacle for an adaptable port. In this illustration, a connector 600 may include a shell 605 and a plug 615 having multiple electrical contacts, the plug intended to mate with a port receptacle or socket 655 of a device 650 to engage with certain corresponding electrical contacts, the receptacle 655 shown installed in a certain plate 660 of the device 650. In some embodiments, the connector 600 may include one or more keys 610 for purposes of preventing certain connections and for purposes of enabling certain switching for the device 650.

In some embodiments, if the port of the device 650 is intended to receive the connector 600, such in a circumstance in which the port is an adaptable port and the connector 600 is for a cable to transfer a multimedia data signal that requires detection and adaptation, then the connector may fit the receptacle, with the keying providing certain data. For example, the plate 660 of the device 650 may include a passage or passages 665 through the plate 660 to accept the one or more keys 610 of the connector 600 and allow insertion of the connector 600 into the device 650. In some embodiments, a device may include one or more switches 670, shown here as switches 670 connected to a circuit board 675. In some embodiments, the one or more switches may form a part of the port receptacle 655. In this illustration, the one or more keys 610 will engage the one or more switches 670 if the connector 600 and the port of the device 650 are compatible.

In some embodiments, the insertion of the connector 600 into the port receptacle 655, the port being an adaptable port, and the accompanying engagement of the one or more switches 670 by the one or more keys 610 of the connector 600 will result in providing certain information to allow detection of the multimedia data Source. In some embodiments, detection of a multimedia data Source may utilize indirect electrical indication of the signal format, such as by detection of an impedance or pull-up or pull-down voltage. In some embodiments, detection of a multimedia data Source may utilize pre-engagement of contacts, such as certain contacts in the plug 615 engaging contacts of the port receptacle 655 before other contacts are engaged, In some embodiments, an adaptable port receptacle will include the passage 665 for the keys while a non-adaptable port receptacle will not include such passage 665. In some embodiments, the existence of the one or more keys 610 of the connector 600 may identify the cable as a cable carrying a signal format that requires detection and adaptation. In some embodiments, the keying and receptacle may be utilized ensure that a cable carrying a multimedia data signal format that requires detection and adaptation is only mated with an adaptable port receptacle, while a standard multimedia signal format (such as HDMI) that matches the format of a standard port (an HDMI port, in this example) may be mated with either an adaptable port receptacle or a non-adaptable port receptacle.

In some embodiments, the device 650 further includes an audio port or ports for the reception of audio data 680. In this example, the audio port comprises a first receptacle (such as a left channel receptacle) 682 and a second receptacle (such as a right channel receptacle) 684. In other examples the device 650 may include a single channel and receptacle for audio (such as for monaural audio) or may include multiple channels incorporated into a single receptacle, such a stereo jack connection. In some embodiments, the audio port or ports may receive audio signals provided from a Source device via one or more audio cables 675.

Figure 7:
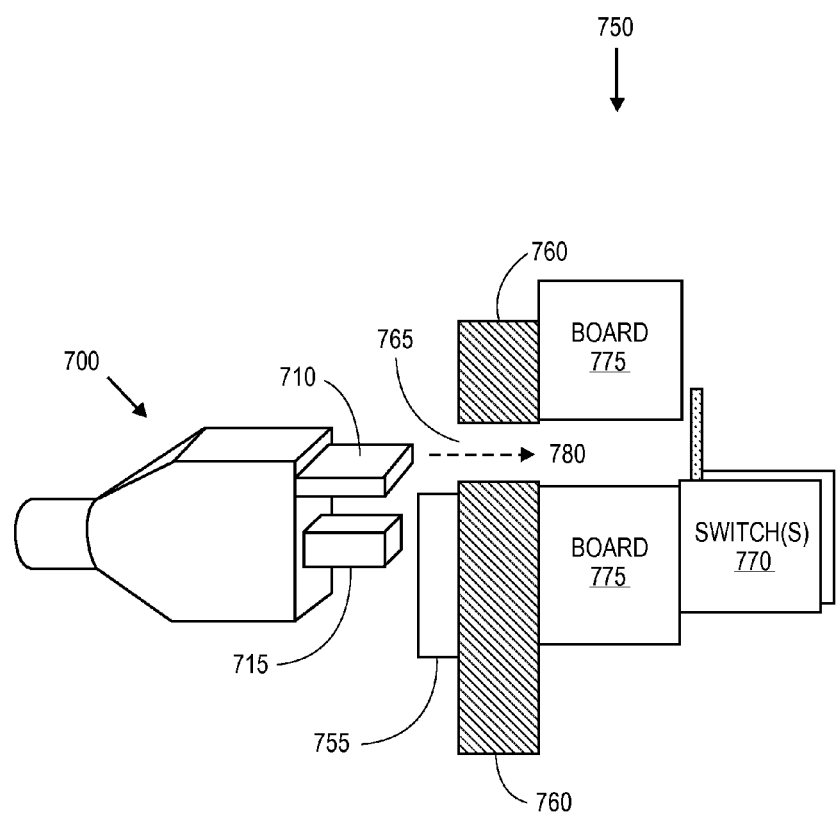
FIG. 7 is an illustration of an embodiment of a device including an adaptive port receptacle and a passage through a circuit board.

FIG. 7 is an illustration of an embodiment of a device including an adaptive port receptacle and a passage through a circuit board. In some embodiments, a device 750 includes a port receptacle or socket 755 installed in a plate 760 having a passage 765 to accept one or more keys 715 of a connector 700, where the connector further includes a plug 715 having multiple electrical contacts, the plug intended to mate with the port receptacle or socket 755 of the device 750. In some embodiments, a circuit board 775 may include a notch or hole 780 for passage of the key or keys 710, the board 775 thus being essentially parallel to the plate 760. In some embodiments, one or more switches 770 may be attached on the board 775 or may be a part of the port receptacle 755 to detect the insertion of keys of a connector into the device 750.

Figure 8:
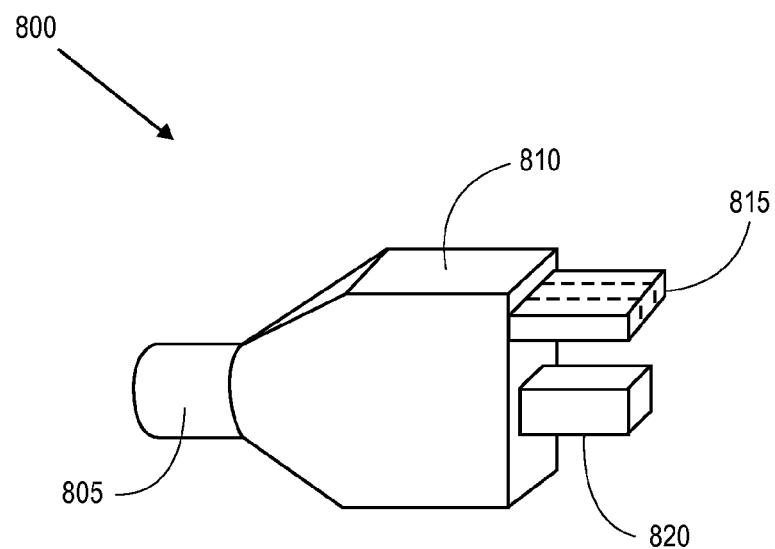
FIG. 8 is a illustration of an embodiment of a adaptive port connector including one or more keys.

FIG. 8 is an illustration of an embodiment of a connector including one or more keys. In this illustration, a connector 800 is connected at an end of a cable 805. The connector 800 may include a shell 810 and plug 820 for connection with a port receptacle via multiple electrical contacts. In some embodiments, the connector 800 includes one or more keys 815 for use in preventing certain connections and for use in enabling certain switching in connections.

While the keying may vary in shape and position, as illustrated the keys 815 are designed to be in line with the plug 820 such that the keys 815 are inserted into a passage of a device when the connector 800 is inserted into a port receptacle of a device, and such that the keys will prevent insertion into a device if there is no compatible passage for the key or keys 815. In some embodiments, a system utilizes the keying of a plug in the detection of a multimedia data Source device.

Figure 9:
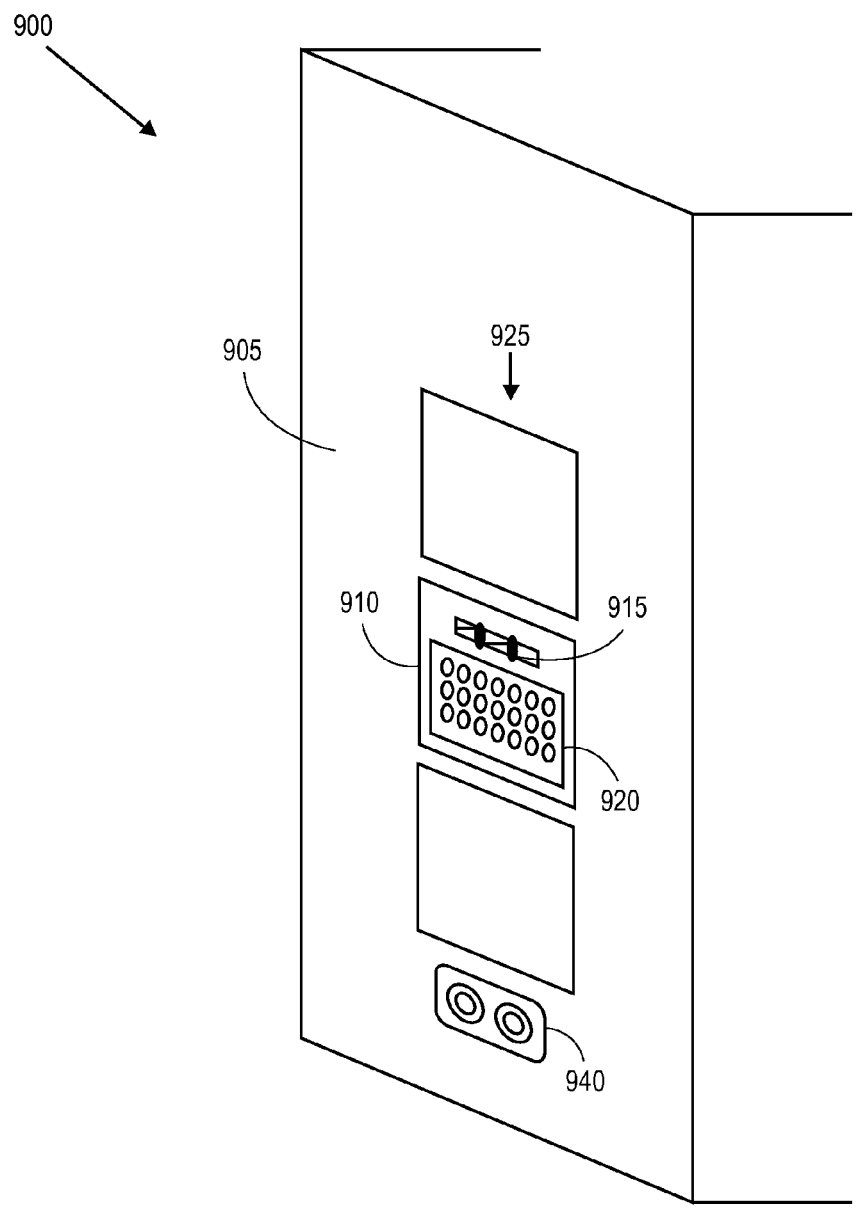
FIG. 9 is an illustration of an embodiment of a device including an adaptive port receptacle for a keyed connector.

FIG. 9 is an illustration of an embodiment of a device including an adaptive port receptacle for a keyed connector. In this illustration, a device 900 includes a plate or wall 905 into which a port receptacle unit or element 910 is installed. The port receptacle unit 910 includes a port receptacle 920, which may include multiple electrical connects or pins to engage with electrical contacts of a plug of a connector. The device 900 may include multiple receptacles 925, such as a grouping of such receptacles. In some embodiments, the device may include one or more adaptable port receptacles and one more non-adaptable port receptacles. In some embodiments, the port receptacle unit 910 includes one or more passages 915 for acceptance of one or more keys of a connector. In some embodiments, the passages may not allow certain connectors to be inserted if the keying does not match the passages 915. In some embodiments, the device 900 includes one or more port switches that may or may not be enabled depending on the particular keying of a connector. In some embodiments, the device 900 may further include one or more audio ports 940 for the reception of audio data.

Figure 10:
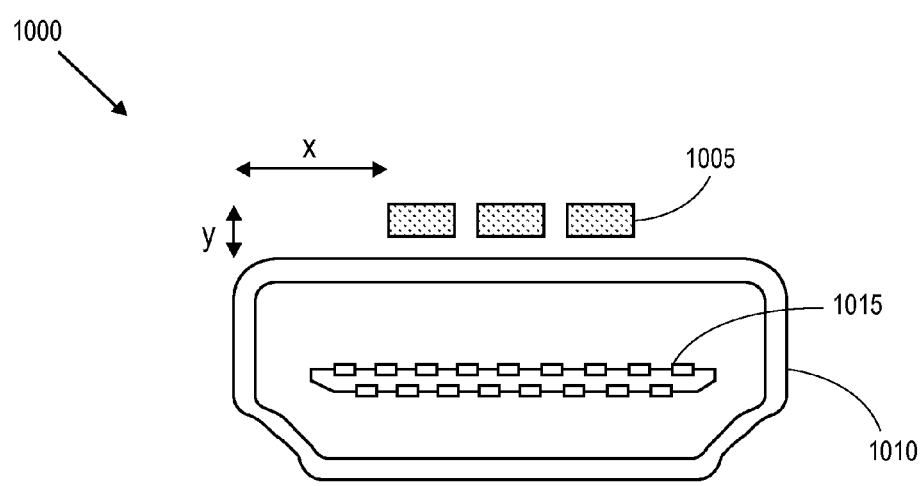
FIG. 10 is an illustration of an embodiment of an adaptive port receptacle for a keyed connection.

FIG. 10 is an illustration of an embodiment of an adaptive port receptacle for a keyed connection. In this illustration, a port receptacle unit 1000 includes a port receptacle 1010 for a particular plug, such as, for example, an HDMI compatible receptacle for an HDMI compatible plug of a cable. In some embodiments, the receptacle unit 1000 also includes one or more passages 1005 for the acceptance of one or more keys of a connector. In some embodiments, there may be a single passage to accept one or more keys, and in some embodiments, there may be multiple passages for the one or more keys. While the illustrated passages are of rectangular shape, the passages and associated keys are not necessarily rectangular, and may be of a different shape, such as circular or oval shapes. If there are multiple passages, the passages are not necessarily each of the same size and shape, and are not necessarily equally spaced or arranged in line with each other.

In some embodiments, the passages may be required to be placed within certain dimensions. For example, the passages 1005 may be required to lie within a distance y from the receptacle 1010. In another example, the passages 1005 may be required to be a certain distance x from an edge of the receptacle 1010. In some embodiments, such dimensions may be required to conform to protocols for receptacles, or may be required to allow multiple receptacles to be placed near each other, or may be required to prevent the passages from interfering with screws or connectors for the receptacle unit 1000. For example, a protocol may have limitations in connector size, and the dimension may ensure that the keying for a connector is within a maximum overmold dimension while not interfering with electrical connections for the connector.

Figure 11:
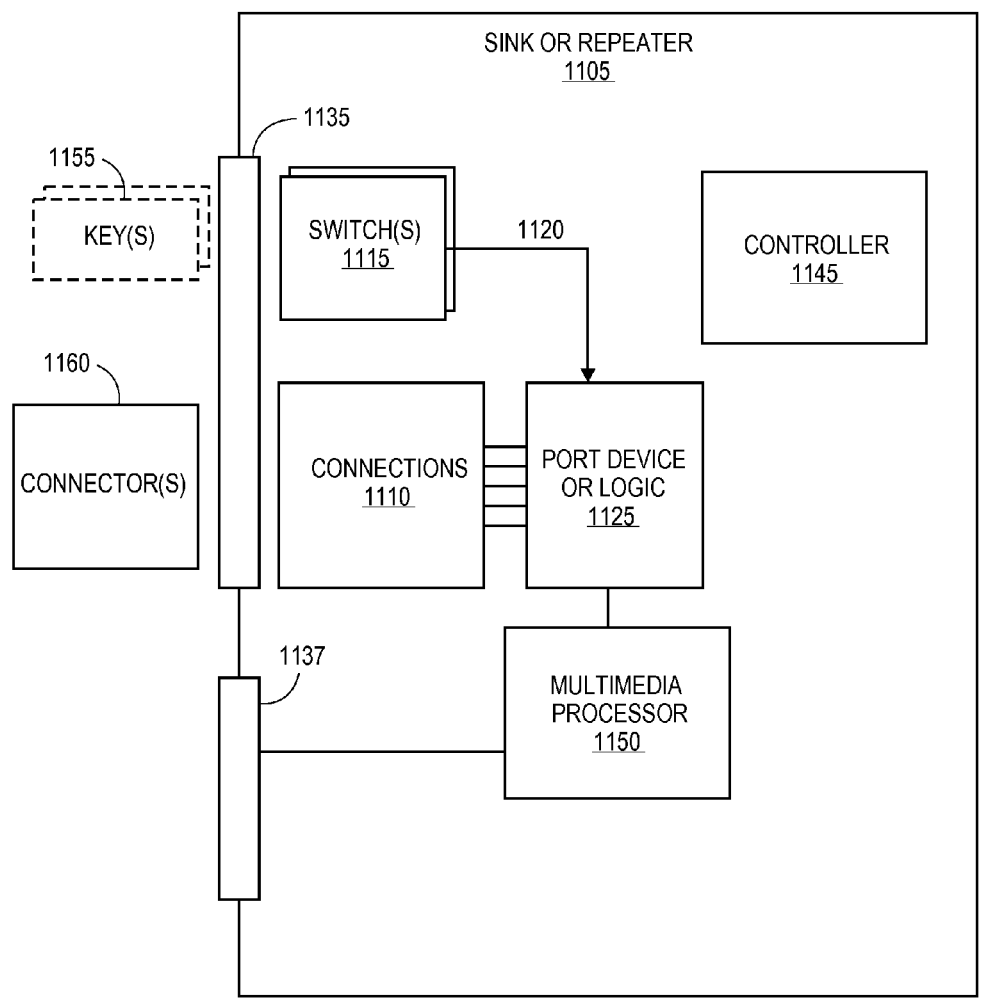
FIG. 11 illustrates an embodiment of an adaptive port Sink or repeater unit.

FIG. 11 illustrates an embodiment of an adaptive port Sink or repeater unit. In this illustration, a Sink or repeater unit 1105 for the reception of multimedia data includes an adaptable port receptacle 1135 for acceptance of a compatible connector 1160 that may include one or more keys 1155. The unit 1105 may include one or more other port receptacles 1137, where the additional ports may include adaptable ports and non-adaptable ports. The port receptacle 1135 may include one or more switches 1115 to be engaged by the one or more keys 1155 if the keys 1155 match one or more patterns that are compatible with the unit 1105. In some embodiments, the switches 1115 may enable one or more signal lines 1120 to connect with an adaptable port device or logic 1125. In some embodiments, the one or more signal lines 1120 may inform the adaptable port device 1125 that the connector 1160 is providing a multimedia signal format that requires detection and port adaptation.

In some embodiments, the port receptacle 1135 includes or is coupled with a signal format detector and switch unit or module 1110 to detect multimedia signal formats and to adapt the port as needed for the detected multimedia signal format. The signal format detector and switch may be coupled with the adaptable port device 1125, where the adaptable port device may process the received data for presentation to a multimedia processor 1150. The Sink or repeater unit 1105 may further include a controller 1145 to control the operation of the elements of the unit 1105.

Figure 12:
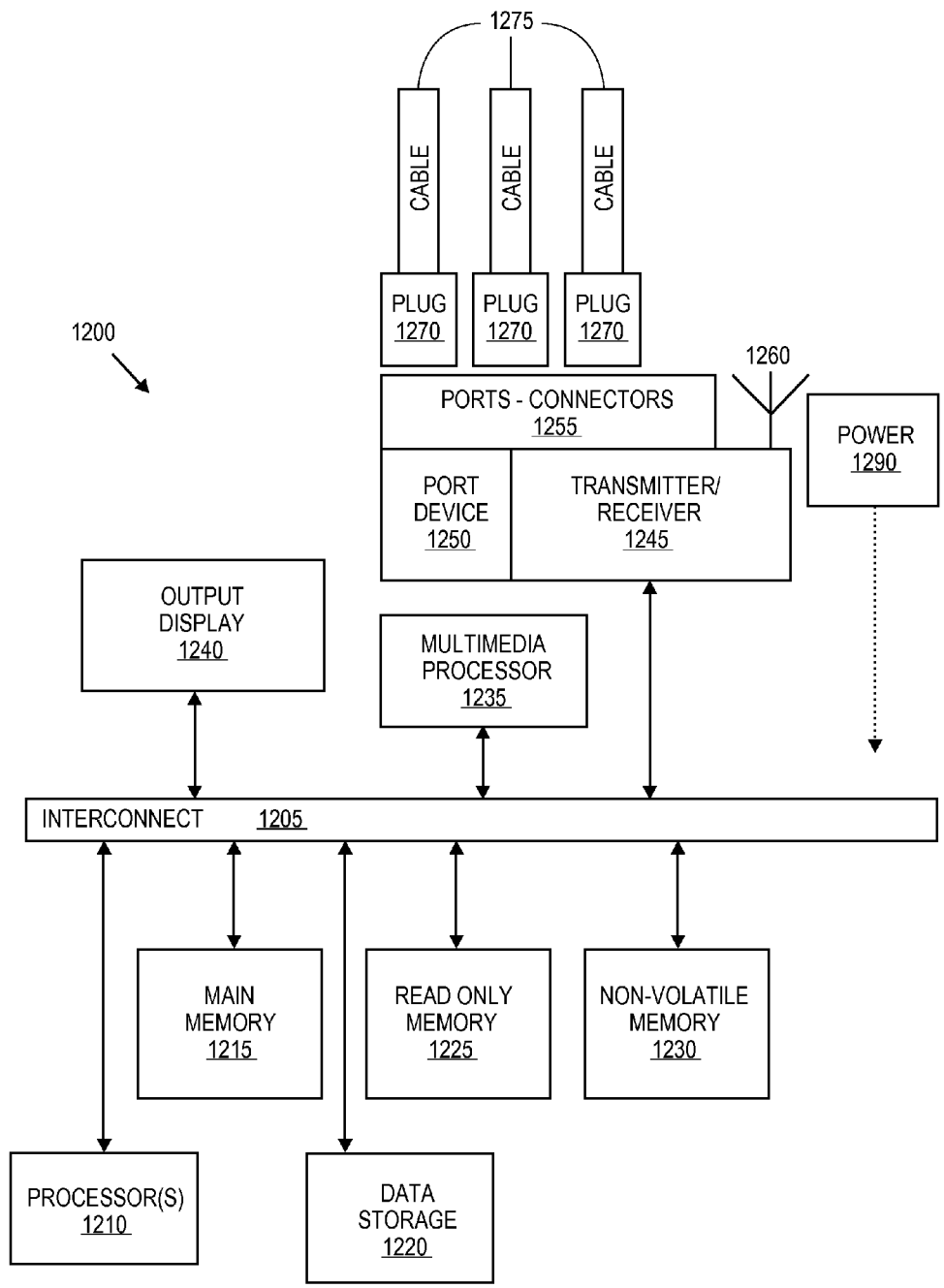
FIG. 12 illustrates an embodiment of an apparatus to provide adaptive port interconnection.

FIG. 12 illustrates an embodiment of an apparatus to provide adaptive port interconnection. In this illustration, certain standard and well-known components that are not germane to the present description are not shown. Under some embodiments, a device 1200 may be a Sink device or repeater device.

Under some embodiments, the device 1200 comprises an interconnect or crossbar 1205 or other communication means for transmission of data. The data may include various types of data, including, for example, audio-visual data and related control data. The device 1200 may include a processing means such as one or more processors 1210 coupled with the interconnect 1205 for processing information. The processors 1210 may comprise one or more physical processors and one or more logical processors. Further, each of the processors 1210 may include multiple processor cores. The interconnect 1205 is illustrated as a single interconnect for simplicity, but may represent multiple different interconnects or buses and the component connections to such interconnects may vary. The interconnect 1205 shown in FIG. 12 is an abstraction that represents any one or more separate physical buses, point-to-point connections, or both connected by appropriate bridges, adapters, or controllers. The interconnect 1205 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 1200 further comprises a random access memory (RAM) or other dynamic storage device as a main memory 1215 for storing information and instructions to be executed by the processors 1210. Main memory 1215 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 1200 also may comprise a read only memory (ROM) 1225 or other static storage device for storing static information and instructions for the processors 1210. The device 1200 may include one or more non-volatile memory elements 1230 for the storage of certain elements.

Data storage 1220 may also be coupled to the interconnect 1205 of the device 1200 for storing information and instructions. The data storage 1220 may include a magnetic disk, an optical disc and its corresponding drive, or other memory device. Such elements may be combined together or may be separate components, and utilize parts of other elements of the device 1200.

The device 1200 may also be coupled via the interconnect 1205 to an output display or presentation device 1240. In some embodiments, the display 1240 may include a liquid crystal display (LCD), a plasma display, or any other display technology, for displaying information or content to an end user. In some embodiments, the display 1240 may be utilized to display television content. In some environments, the display 1240 may include a touch-screen that is also utilized as at least a part of an input device. In some environments, the display 1240 may be or may include an audio device, such as a speaker for providing audio information, including the audio portion of a television program.

One or more transmitters or receivers 1245 may also be coupled to the interconnect 1205. In some embodiments, the device 1200 may include one or more port receptacles 1255 for the reception or transmission of data, such as multimedia data. The ports 1255 may include one or more adaptable ports, and may further include one or more non-adaptable ports. In some embodiments, the device may include an adaptable port device 1250 to provide adaptive port interconnections. The ports 1255 may be configured to couple with connectors, each connector including a plug 1270 coupled with a cable 1275. In some embodiments, the device 1200 may include a multimedia processor 1235 coupled with the interconnect 1205, the multimedia processor 1235 providing for the processing of multimedia data, including multimedia data received via the ports 1255.

The device 1200 may further include one or more antennas 1260 for the reception of data via radio signals. The device 1200 may also comprise a power device or system 1290, which may comprise a power supply, a battery, a solar cell, a fuel cell, or other system or device for providing or generating power. The power provided by the power device or system 1290 may be distributed as required to elements of the device 1200.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
one or more ports, the one or more ports including one or more adaptable ports, each adaptable port including a receptacle to accept a plug of a connector element for connection of a cable, the receptacle including a plurality of electrical contacts;
an adaptable port device to process data including multimedia data received from one or more connected multimedia data sources at the one or more adaptable ports, wherein the adaptable port device is operable to:
detect a multimedia signal format for each multimedia data source that is connected with an adaptable port of the one or more adaptable ports, and
adapt each of the adaptable ports that is currently connected to be compatible with the detected multimedia signal format for the connected multimedia data source; and
a signal format detector and switch for each of the one or more adaptable ports, the signal format detector for an adaptable port to detect a multimedia signal format for data received at the adaptable port and the switch to direct the data to one of a plurality of elements based on a class of the detected multimedia signal format;
wherein the plurality of elements includes a first multiplexer and a second multiplexer, and the switch of each of the one or more adaptable ports is to direct data to the first multiplexer for multimedia data of a first class from the adaptable port and is to direct data to the second multiplexer for multimedia data of a second class from the adaptable port;
wherein the first multiplexer is an analog multiplexer for multiplexing the first class of data, the first class of data being data having an analog multimedia signal format, and the second multiplexer is a digital multiplexer for multiplexing the second class of data, the second class of data being data having a digital multimedia signal format.

2. The apparatus of claim 1, wherein each of the one or more adaptable ports has the same receptacle type.

3. The apparatus of claim 2, wherein the receptacle type is a standard receptacle type for the reception or transmission of multimedia data.

4. The apparatus of claim 3, wherein the receptacle type is a receptacle that is compatible with HDMI™ (High-Definition Multimedia Interface).

5. The apparatus of claim 1, wherein the adaptable port device is to detect a multimedia signal format for a connected multimedia data source that provides multimedia data received at each of the one or more adaptable ports using one or more of the following detection processes:
detection of keying of a connector;
indirect electrical detection of a multimedia signal format; and
pre-engagement of one or more contacts of the connector.

6. The apparatus of claim 1, wherein the one or more ports further includes one or more non-adaptable ports, wherein the port device does not adapt the one or more non-adaptable ports.

7. The apparatus of claim 1, wherein the one or more ports further includes one or more ports to provide output of multimedia data.

8. The apparatus of claim 7, wherein the one or more ports to provide output of multimedia data are bi-directional ports, the bi-directional ports allowing for both input and output of multimedia data.

9. The apparatus of claim 1, further comprising a multimedia processor to process multimedia data received from the adaptive port device.

10. A method comprising:
receiving data including multimedia data at a first adaptable port via a connector element for connection of a cable in a receptacle for a device, the device having one or more ports including one or more adaptable ports;
detecting a multimedia signal format for a first multimedia data source connected with the first adaptable port; and
adapting the first adaptable port in accordance with the detected multimedia signal format for the first multimedia data source including switching the first adaptable port to direct received data to one of a plurality of elements based on a class of the detected multimedia signal format;
wherein the plurality of elements includes a first multiplexer and a second multiplexer, and wherein adapting the first adaptable port includes directing the received data to the first multiplexer for multimedia data of a first class and directing the received data to the second multiplexer for multimedia data of a second class;
wherein the first multiplexer is an analog multiplexer for multiplexing the first class of data, the first class of data being data having an analog multimedia signal format, and the second multiplexer is a digital multiplexer for multiplexing the second class of data, the second class of data being data having a digital multimedia signal format.

11. The method of claim 10, wherein detecting the multimedia signal format of the multimedia data received at the first adaptable port includes one or more of:
detection of keying of the connector element;
indirect electrical detection of the multimedia signal format; and
pre-engagement of one or more contacts of the connector element.

12. The method of claim 10, wherein the one or more ports of the device further includes one or more non-adaptable ports, and further comprising processing multimedia data at a non-adaptable port without detecting the multimedia signal format for a connected multimedia data source and without adapting the adaptable port to the multimedia signal format for the connected multimedia data source.

13. An adaptable port device comprising:
one or more ports, the one or more ports including one or more adaptable ports, each adaptable port including a receptacle to accept the plug of a connector element for connection of a cable, the receptacle including a plurality of electrical contacts; and
an adaptable port device for each of the one or more adaptable ports to process data including multimedia data received from one or more connected multimedia data sources at the one or more adaptable ports, the adaptable port device for each adaptable port including a signal format detector and switch, the signal format detector for an adaptable port to detect a multimedia signal format for a multimedia data source connected with the adaptable port and the switch to direct the data to one of a plurality of multiplexers based on a class of the detected multimedia signal format for the connected multimedia data source;
a first multiplexer of the plurality of multiplexers to receive multimedia data of a first class from the one or more adaptable ports, the first multiplexer being an analog multiplexer and the first class of multimedia data being data having an analog multimedia signal format; and a second multiplexer of the plurality of multiplexers to receive multimedia data of a second class from the one or more adaptable ports, the second multiplexer being a digital multiplexer and the second class of multimedia data being data having a digital multimedia signal format;

wherein the device is operable to:
detect a multimedia signal format for each multimedia data source that is connected with an adaptable port of the one or more adaptable ports, and
adapt each of the adaptable ports that is currently connected to be compatible with the detected multimedia signal format for the connected multimedia data source.

14. The device of claim 13, wherein each of the one or more adaptable ports have the same receptacle type.

15. The device of claim 14, wherein the receptacle type is a standard receptacle type for the reception or transmission of multimedia data.

16. The device of claim 15, wherein the receptacle type is a receptacle that is compatible with HDMI™ (High-Definition Multimedia Interface).

17. The device of claim 13, wherein the device is to detect a multimedia signal format for a connected multimedia data source that provides multimedia data received at each of the one or more adaptable ports using one or more of the following detection processes:

detection of keying of a connector;

indirect electrical detection of a multimedia signal format; and pre-engagement of one or more contacts of the connector.

18. The device of claim 13, wherein the one or more ports further includes one or more non-adaptable ports, wherein the port device does not adapt the one or more non-adaptable ports.

* * * * *